United States Patent
Mei (10) Patent No.: US 7,460,337 B1
(45) Date of Patent: Dec. 2, 2008

(54) LOW DENSITY, HIGH RIGIDITY DISK DRIVE SUSPENSION FOR HIGH RESONANCE FREQUENCY APPLICATIONS

(75) Inventor: Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 392 days.

(21) Appl. No.: 11/485,085

(22) Filed: Jul. 12, 2006

Related U.S. Application Data (60) Provisional application No. 60/817,716, filed on Jun. 30, 2006.

(51) Int. Cl.
*G11B 5/60* (2006.01)
(52) U.S. Cl. .................................... 360/244.3
(58) Field of Classification Search ............. 360/244.2, 360/244.3, 244.5, 244.8, 244.9, 245.5
See application file for complete search history.

(56) References Cited

U.S. PATENT DOCUMENTS

| | | | |
|---|---|---|---|
| 3,845,727 A | 11/1974 | Chase | |
| 5,691,581 A | 11/1997 | Umehara et al. | |
| 5,731,931 A | 3/1998 | Goss | |
| 5,734,526 A | 3/1998 | Symons | |
| 5,735,426 A | 4/1998 | Babcock et al. | |
| 5,850,319 A * | 12/1998 | Tangren | 360/244.9 |
| 5,894,655 A | 4/1999 | Symons | |
| 5,966,269 A | 10/1999 | Marek et al. | |
| 6,014,289 A | 1/2000 | Goss | |
| 6,680,826 B2 | 1/2004 | Shiraishi et al. | |
| 6,731,465 B2 | 5/2004 | Crane et al. | |
| 6,801,405 B2 | 10/2004 | Boutaghou et al. | |
| 2002/0085313 A1 * | 7/2002 | Boutaghou et al. | 360/244.9 |
| 2002/0109943 A1 * | 8/2002 | Crane et al. | 360/244.3 |

* cited by examiner

*Primary Examiner*—Jefferson Evans
(74) *Attorney, Agent, or Firm*—Intellectual Property Law Office of Joel D. Voelzke (57) ABSTRACT

A disk drive suspension component for carrying a slider at a disk is formed of a laminate of at least three metal layers of like mechanical and chemical formability, including a first outer layer, a second outer layer, and an intermediate layer, at least one of the layers having a void-containing interior and a surface area having an undivided series of local regions distributed across substantially the width and length thereof with each local region equaling less than 10% of the surface area. Each of the local regions have an overall pattern of discontinuities and lands between the discontinuities substantially the same as the overall pattern of discontinuities and lands in laterally and longitudinally adjacent local regions for local attachment of the layers at some and not all of the lands to adjacent layers to form a laminate having common formability properties, high rigidity and light weight.

45 Claims, 6 Drawing Sheets

LOW DENSITY, HIGH RIGIDITY DISK DRIVE SUSPENSION FOR HIGH RESONANCE FREQUENCY APPLICATIONS

CROSS-REFERENCE TO RELATED APPLICATIONS

This application claims the benefit of U.S. Provisional Application Ser. No. 60/817,716, filed Jun. 30, 2006.

BACKGROUND OF THE INVENTION

1. Field of the Invention

This invention relates to disk drive suspensions, and more particularly to components for such suspensions such as load beams where light weight through low equivalent density construction, and rigidity through spacing of component layers with a lower density intermediate layer for high resonance frequency applications is desired. The invention further relates to such an improved component formed of chemically and mechanically like materials such as stainless steel or aluminum in all layers for ease, convenience and lowered cost in manufacturing operations such as forming rails and etching features.

2. Description of the Related Art

Each suspension application has a vertical stiffness requirement for the load beam component that requires a particular stiffness or rigidity in the load beam. The required stiffness or rigidity can be achieved by beam thickness increases but this typically undesirably increases unsprung mass in the suspension, by use of side rails which are flanges at an angle to the general plane of the load beam, and use of relatively thin and lightweight materials shaped and combined to provide a greater apparent thickness without adding a comparable amount of mass, e.g. monocoque structures.

BRIEF SUMMARY OF THE INVENTION

The formation of load beam and like rigid suspension components from lightweight laminates of metal outer layers and a plastic intermediate layer is limited by the disparate materials of the laminates, e.g. stainless steel layers sandwiching a polyimide layer. The presence of the polyimide means that there are different coefficients of thermal expansion (CTE) across the layers of the laminate which can cause distortions in these precision parts. Also, the common practice of chemically treating the stainless steel or aluminum for broadly shaping, functional aperturing, weight reduction and other purposes is complicated by the presence of the generally chemically inert polyimide layer in the laminate.

It has now been discovered that the problems of laminate structures such as load beams and like rigid components of suspensions can be overcome by substituting a new like material layer, such as a metal layer, in the laminate, e.g. as a spacing or outer layer, having a lower density than the other layers through the presence of interior voids and having surface discontinuities, e.g. through being an interfitted or woven wire or a honeycomb structure to give rigidity through layer separation and light weight through the low density of the structure. A further benefit is the possibility of using for the intermediate layer a layer of a material that is chemically and mechanically formable with the outer layers, e.g. an aluminum or stainless steel wire, or honeycomb where the outer layers are aluminum or stainless steel. An advantage of this approach is that the CTE's of the several layers are the same or alike boding well for like thermal response and no distortions from disparate expansions of parts, e.g. in side rails formed on the load beam. Also, etchants can be used that will etch the several layers simultaneously such as a spacing intermediate layer with the outer layers in a single operation, resulting in manufacturing economies. While the invention will be generally described with particular reference to a three-layer construction, the number of layers is not limited providing fabrication operations can be carried out. Also, while the common situation is a discontinuous surface on the intermediate layer, the outer layers can have such surfaces and the intermediate layer can have one or both surfaces opposed to the outer layers continuously planar, discontinuity-free surfaces. Further, connection of widely different surfaces is made possible by the nearly universal provision of attachment sites, corresponding to the lands between discontinuities, and the possible use of fewer than all such sites, e.g. only those opposed by a specific portion of an opposing layer. The presence of interior voids, such as honeycomb lacunae and gaps between adjacent wire strands, provides a beam effect increase in rigidity without added weight. The foregoing advantageous results are the objects of the invention.

These and other objects of the invention to become apparent hereinafter are realized in a disk drive suspension component for carrying a slider at a disk, the component comprising a laminate of at least three metal layers of like mechanical and chemical formability, the laminate including a first outer layer, a second outer layer, and an intermediate layer, at least one of the layers having a void-containing interior and a surface area and comprising a series of local regions distributed across substantially the width and length thereof with each the local region equaling less than 10% of the surface area, each of the local regions having an overall pattern of discontinuities and lands between the discontinuities substantially the same as the overall pattern of discontinuities and lands in laterally and longitudinally adjacent local regions for local attachment of the layers at some and not all of the lands to adjacent layers to form a laminate having common formability properties.

In this and like embodiments, typically, the disk drive suspension component is a load beam, and at least one of the layers comprises stainless steel or aluminum, the at least one layer is the intermediate layer, or the at least one layer is an outer layer, or the first and second outer layers each define the at least one layer, the at least one layer comprises multiple strands, e.g. of a stainless steel wire, arranged to define along their lengths the local region overall pattern of discontinuities, the at least one layer multiple strands are interfitted to define the intermediate layer, the at least one layer strands are interwoven to have alternate successive portions of alternate interwoven strands at the at least one layer surfaces opposite an other layer, or in a further embodiment, the at least one layer comprises a honeycomb panel arranged to define along its length the local region overall pattern of discontinuities, the at least one layer honeycomb panel defines a multiplicity of through openings, the at least one layer honeycomb panel defines a multiplicity of blind openings as well as the multiplicity of through openings in a load beam, and the outer layers are apertured in registration with the blind openings against entrapment of liquids within the blind openings, e.g. in a load beam suspension component in which at least one of the layers comprises stainless steel or aluminum.

In a further embodiment, the invention provides a disk drive suspension component for carrying a slider at a disk, the component comprising a laminate of at least three metal layers of like mechanical and chemical formability, the laminate including a first outer layer, a second outer layer, and an intermediate layer, the intermediate layer having a void-containing interior providing a lower density than at least one of the outer layers and a surface area and comprising a series of local regions distributed across substantially the width and length of the intermediate layer with each the local region equaling less than 10% of the surface area, each of the local regions having an overall pattern of discontinuities and lands between the discontinuities substantially the same as the overall pattern of discontinuities in laterally and longitudinally adjacent local regions for local attachment of the layers at some and not all of the lands to adjacent layers to form a laminate having common formability properties.

Typically in this and like embodiments, the component is a load beam, the first and second outer layers are substantially planar opposite each other, the intermediate layer is grossly substantially planar and has interior voids lowering its density to less than 70% of at least one outer layer, the local region patterns of discontinuities and lands defining locally nonplanar surfaces on the intermediate layer opposite at least one of the first and second outer layers, the intermediate layer has discontinuous nonplanar surfaces opposite both the first and second outer layers, the intermediate layer comprises multiple strands arranged to define along their lengths the local region overall pattern of discontinuities and lands, the intermediate layer multiple strands are interfitted to define the intermediate layer, the intermediate layer strands are interwoven to have alternate successive portions of alternate interwoven strands define the lands at the intermediate layer surfaces opposite the first and second outer layers, the intermediate layer comprises multiple strands interfitted to define the intermediate layer, successive portions of the strands defining the lands and thereby a distributive pattern of oppositely facing attachment sites for attaching the intermediate layer to the outer layers, the intermediate layer strands are interwoven, the successive strand portions of alternate interfitted strands defining successively the lands as oppositely facing attachment sites, the component thus described is a load beam, or the at least one layer comprises a honeycomb panel arranged to define along its length the local region overall pattern of discontinuities and lands, the at least one layer honeycomb panel defines a multiplicity of through openings, the at least one layer honeycomb panel defines a multiplicity of blind openings as well as the multiplicity of through openings, and the outer layers are apertured in registration with the blind openings against entrapment of liquids within the blind openings.

In a further embodiment, the invention provides an assembly for a disk drive suspension component for carrying a slider at a disk, the component assembly comprising a first substantially planar outer layer, a second substantially planar outer layer, and a substantially planar intermediate layer, at least one of the layers having interior voids lowering its density to a value selected from 30%, 50% and 70% of that of at least one outer layer and a nonplanar surface opposite and arranged for substantially universal contact with an other layer and comprising a distributive pattern of numerous potential local attachment sites, at least one of the other layers being attached to the at least one layer at plural ones of the local attachment sites that are less in number than the potential attachment sites, whereby selective attachment of an other layer to the at least one layer is facilitated.

As in previous embodiments, typically the component assembly is a load beam, the at least one layer is the intermediate layer, an outer layer or two outer layers, the at least one layer comprises multiple strands arranged to define along their lengths an overall pattern of discontinuities and lands between the discontinuities, the lands defining the attachment sites, the multiple strands are interwoven to have alternate successive portions of alternate interwoven strands form the lands, the at least one layer comprises a honeycombed panel arranged to define along its length an overall pattern of discontinuities and lands between the discontinuities, the lands defining the attachment sites, and/or the at least one layer honeycomb panel defines a multiplicity of through openings, the at least one layer honeycomb panel defines a multiplicity of blind openings as well as the multiplicity of through openings, the component is a load beam and comprises stainless steel in all layers, and the outer layers are apertured in registration with the openings against entrapment of liquids within the openings.

In a further embodiment, the invention provides a disk drive suspension component for carrying a slider at a disk, the component comprising a laminate of at least three layers including a first substantially planar outer layer, a second substantially planar outer layer, and a substantially planar intermediate layer of lower density than said outer layers and having a nonplanar surface defining a distributive pattern of oppositely facing numerous attachment sites across the intermediate layer opposite the first and second outer layers, the first and second outer layers being fixed to some and less than all of the numerous attachment sites.

In a further embodiment, the invention provides a disk drive suspension component for carrying a slider at a disk, the component comprising an elongated structure having a portion adapted to be cantilevered from the remainder of the structure, the portion comprising a laminate of opposed outer layers having like CTE's and that are too thin to be self-supporting in cantilevered condition and an inner layer having a like CTE to and a lower density than the outer layers, the inner layer spacing the outer layers in cantilevered portion laminate defining relation, the inner layer comprising a web of regularly spaced interior void defining discontinuities and lands defining successive upper and lower attachment sites in bonding relation with the opposing layers, whereby the cantilevered portion laminate is self-supporting in cantilevered condition and in which some and not all of the attachment sites are in the bonding relation.

In its method aspects the invention provides a method of manufacturing a disk drive suspension component, including registering upper and lower metal layers with a metal intermediate layer of relatively lower density than at least one of the upper and lower metal layers overall and having a surface of regularly arranged discontinuities and lands defining numerous attachment sites, and bonding the outer layers to the intermediate layer at some but not all of the attachment sites.

In a further method aspect the invention provides a method of supporting a slider at a disk with a cantilevered component having at least three metal layers, including reducing the density of at least one of said three layers with interior voids, raising numerous protruding attachment sites on at least one of the three layers, bonding the layers together at some but not all of the attachment sites, chemically and/or mechanically altering the metal layers in common, and supporting a slider therewith.

BRIEF DESCRIPTION OF THE SEVERAL VIEWS OF THE DRAWINGS

The invention will be further described in conjunction with the attached drawings in which.

DETAILED DESCRIPTION OF THE INVENTION

It has been found that suspensions made of laminates using as an intermediate or outer layer a wire frame reinforced structure to form the load beam component have superior low equivalent density, while maintaining high rigidity, thus making this suspension suitable for a new applications in high shock environment and especially in high resonance frequency applications.

Figures 2A, 2B:
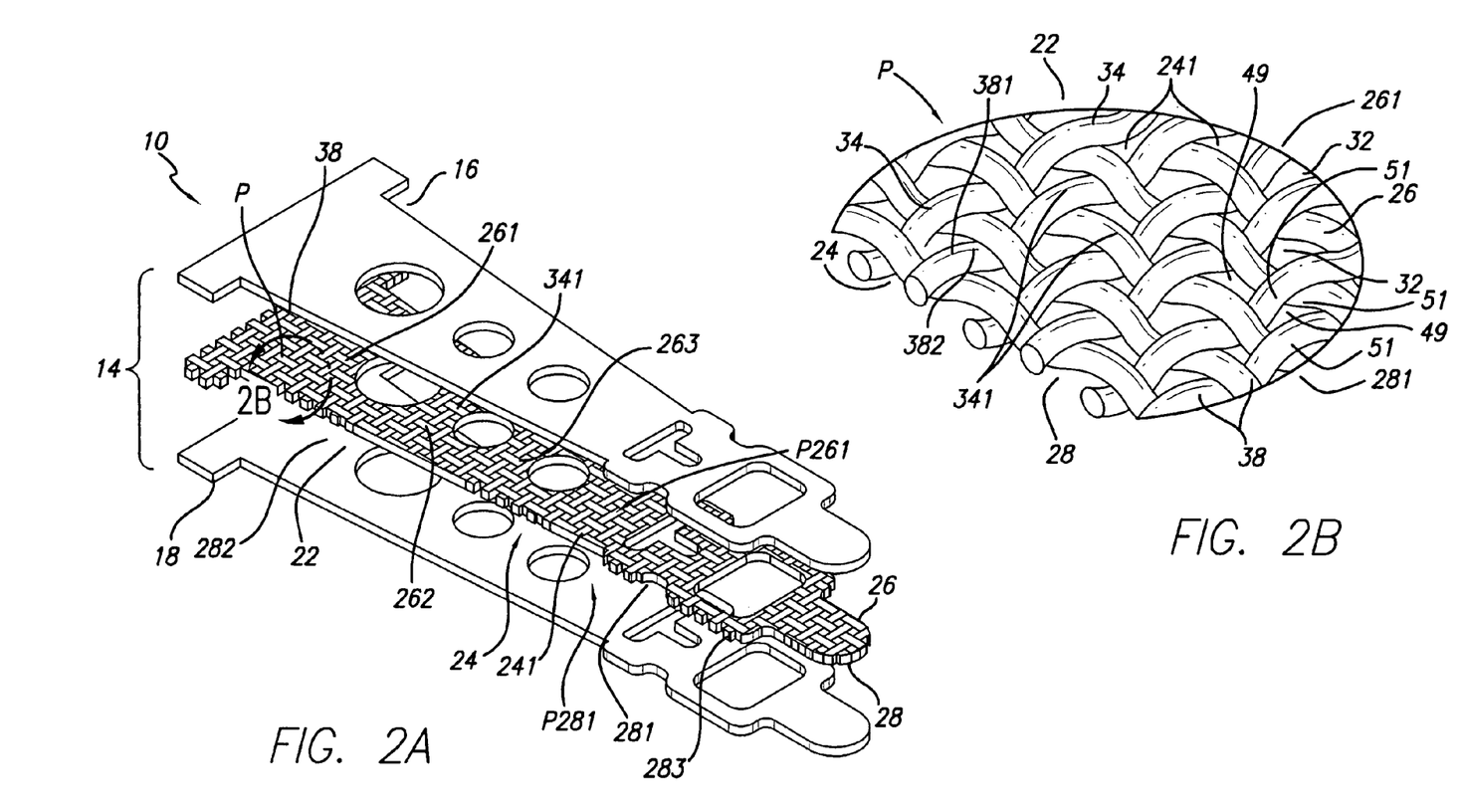
FIG. 2A is an oblique view of a load beam component according to the invention.
FIG. 2B is a view taken on line 2B in FIG. 2A.

Typically, the outer or top and bottom layers are made of super thin stainless steel (25 μm or thinner) and middle layer is made of stainless fiber material (diameter ranges from 2-200 μm); Cf. FIG. 2B. Such stainless steel fiber can be obtained by drawing operation from wire (diameter ca. 3 mm). The three of more laminate layers can be sintered together (diffusion bonding) at a high temperature and then flattened and pressed together in a rolling operation. Adhesive can replace diffusion bonding to glue the three layers together; resin can be sued to fill the fiber/void intermediate (or outer) layer if desired.

The several layers are generally made of metal and are preferably a strong, lightweight material such as titanium and aluminum.

As noted above, there are problems in the etching of polyimide as the intermediate layer and forming it as well as it is a non-metal. Also, it is difficult to form useful structures on the load beam such as the rails, as previously noted, lifters and limiters with the differing CTE's of the layers. Using a void filled, discontinuously surfaced honeycomb or wire mesh structure made of stainless steel as the intermediate layer between additional steel layers enables forming limiter/lifter/rail structures with a 3-layer laminate structure while realizing the rigidity benefits noted above. A considerable added benefit is the ability to etch this structure into different shapes with a single etchant. Further flexibility in manufacture is realized by varying the fiber diameter and mesh density in a mesh embodiment to give a different overall thickness of structure and equivalent density, e.g. a less than 50% density.

Where the suspension arm is the suspension component being made of the invention laminate more than a 3-layer structure, e.g. 5-8 layers, can be used, varying with the overall thickness of arm, with one or more inner or outer layers being provided with variations in height and density to bond only at selected locuses while reducing the total weight and increasing the rigidity through greater thickness or height.

As demonstrated in TABLES 1 and 2 below, some component structures have low density but do not have high rigidity. Some structures have rigidity, but do not have low density (TABLE 1). With the invention structures, all of high rigidity, low density, high damping and improved resonance frequency (TABLE 2) are realized. This combination of properties makes the invention component structures suitable for 1"/1.8"/2.5"/3.5" disk drives and for desktop computer applications, e.g. 11 mm and 9 mm suspensions.

TABLE 1

Comparison of Characteristics of Various Prior Art and Invention Structures

| | High rigidity | Low density | Welding | Forming | Damping |
|---|---|---|---|---|---|
| Old method 1 | Yes | No | Yes | Yes | No |
| Old method 2 | No | Yes | Yes | Yes | Yes |
| Old method 3 | Yes | Yes | No | No | Yes |
| Invention | Yes | Yes | Yes | Yes | Yes |

TABLE 2

Performance Comparisons At Varying Density Reductions (9 mm suspension)

| | Kv (N/m) | B1 | T1 | B2 | T2 | Sway | Shock ('g'/gm) |
|---|---|---|---|---|---|---|---|
| Old method | 26.7 | 6825 | 12536 | 16697 | 33642 | 31755 | 250 |
| Invention (Honeycomb) Equivalent density (30% reduction) | 26.7 | 8158 | 14982 | 19956 | 40000 | 36000 | 326 |
| Invention (Honeycomb) Equivalent density (50% reduction) | 26.7 | 9653 | 17725 | 23612 | 47220 | 39675 | 410 |
| Invention (Honeycomb) Equivalent density (70% reduction) | 26.7 | 12461 | 22875 | 30481 | 60854 | 44654 | 554 |

Figure 3:
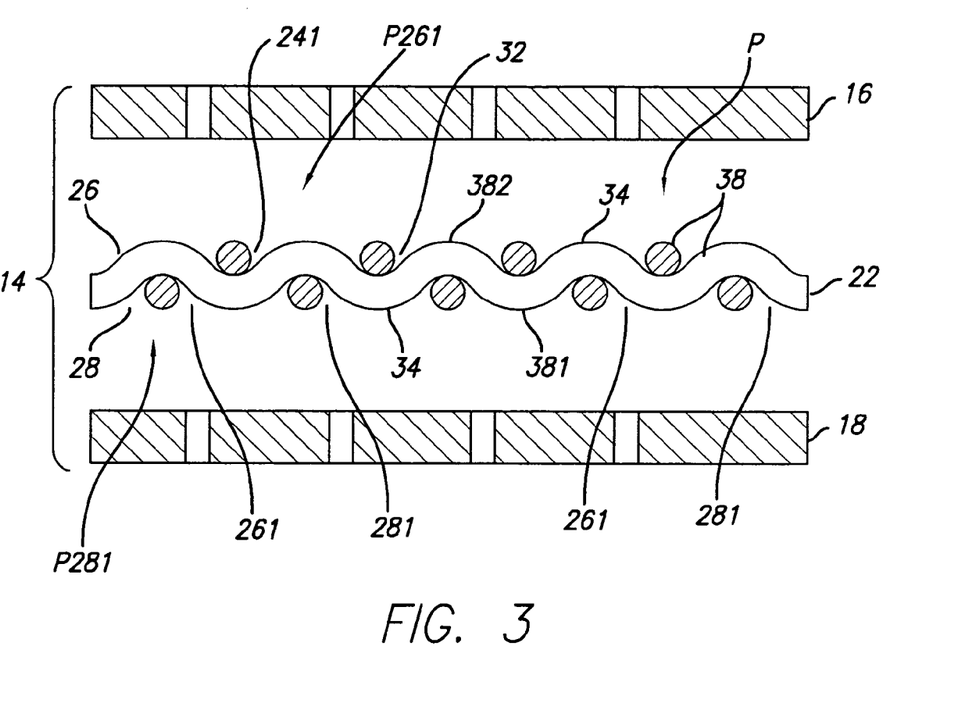
FIG. 3 is an exploded view in cross section of the component shown in FIG. 2A.
Figures 4A, 4B:
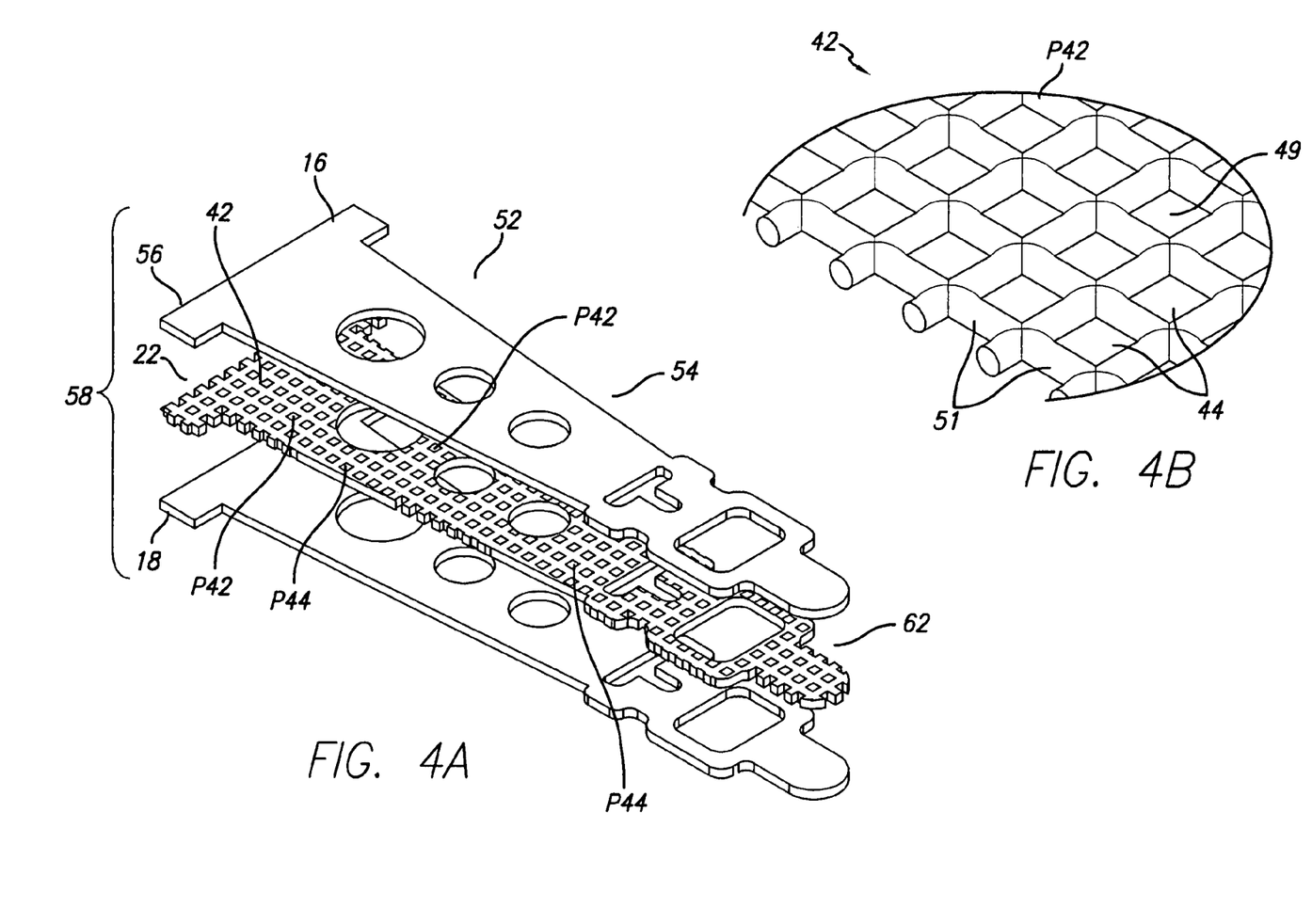
FIG. 4A is a view like FIG. 2A of an alternative embodiment.
FIG. 4B is a view taken on line 4B in FIG. 4A.

With reference now to the drawings in detail, in FIGS. 1, 2A, 2B and 3 the invention disk drive suspension component is shown at 10 for carrying a slider 12 at a disk (not shown), and conductors such as a flex circuit laminate of an additive or subtractive type (not shown). Component 10 comprises a load beam laminate 14 of at least three metal layers 16, 18 and 22 of like mechanical and chemical formability, e.g., each layer comprises stainless steel or aluminum or other metal that can be etched with a common etchant or formed uniformly and permanently. Laminate 14 includes as a first outer layer layer 16, as a second outer layer layer 18, and as an intermediate layer layer 22. In accordance with the invention at least one of the layers 16, 18 and 22 has a void-containing interior 24 and a surface area 26 or 28. Surface areas 26, 28 comprise a series of local regions 261, 262, 263, 281, 282, 283, etc. that are distributed across substantially the width W and length L thereof with each the local region equaling less than 10% of the surface area 26 or 28. It will be noted, see particularly FIGS. 2A, 2B and 3 that each of the local regions 261-283 etc.

have an overall pattern P of discontinuities 32 and lands 34 between the discontinuities in substantially the same pattern P261, P281, etc. as the overall pattern of discontinuities and lands in laterally and longitudinally adjacent local regions unlike localized, discrete and occasional surface features. Lands 34 provide numerous sites 341 for local attachment of the layers 16, 18 and 22 at some and not all of the lands to adjacent layers to form a laminate 14 having common formability properties.

Figure 1:
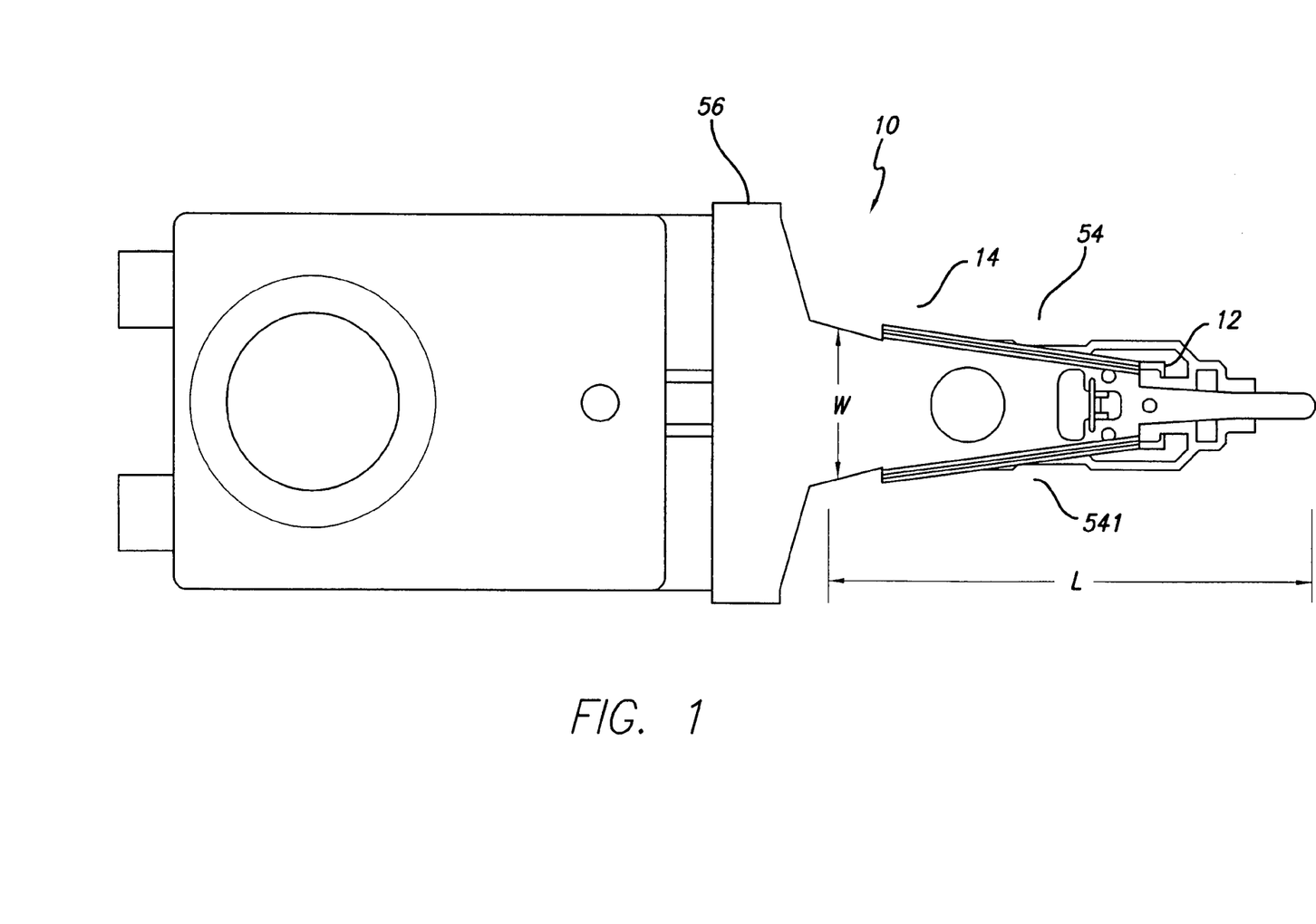
FIG. 1 is a top plan view of a suspension having a component according to the invention.
Figure 5:
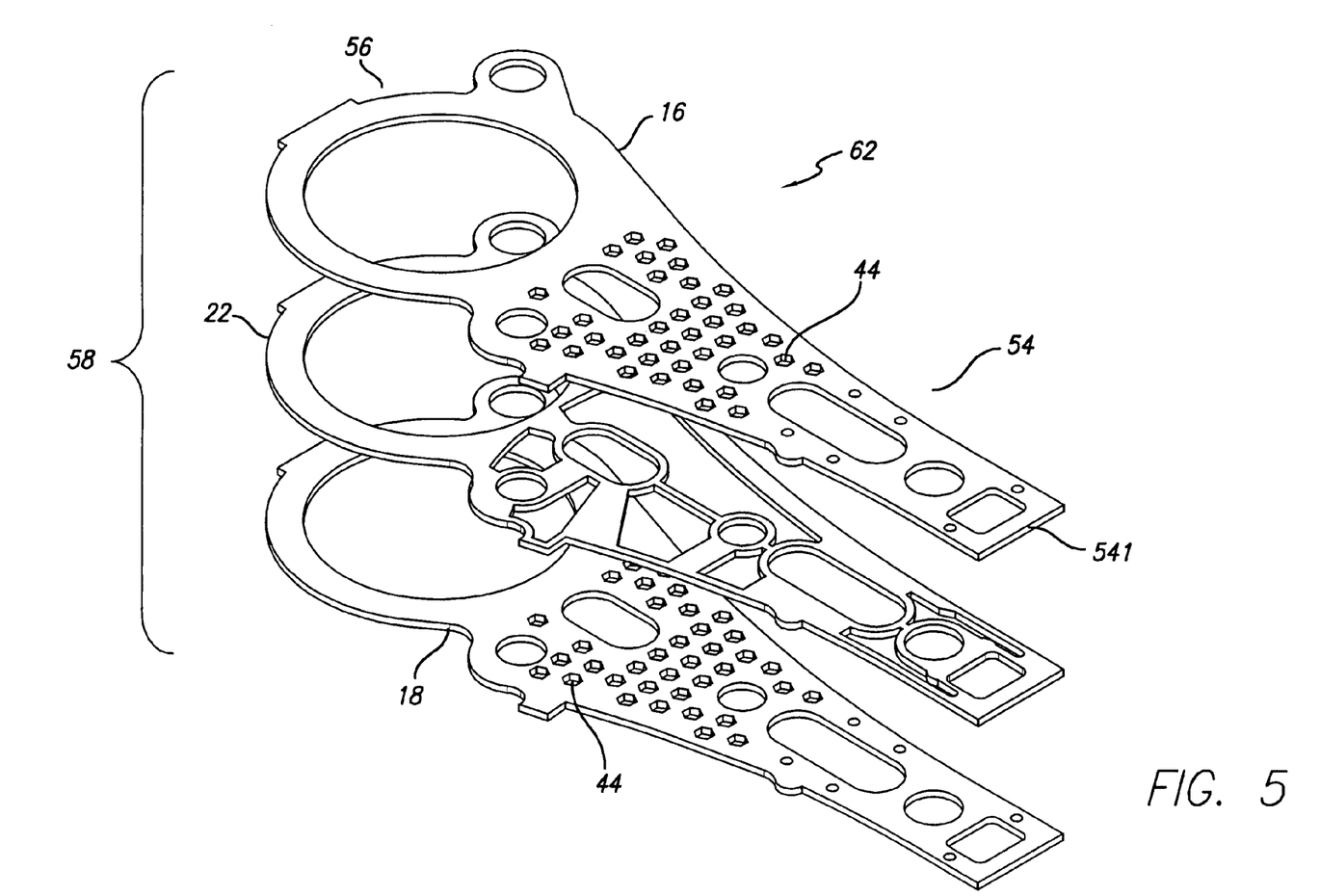
FIG. 5 is a view like FIG. 2A of a further alternative embodiment.

As shown in FIG. 1, typically, the disk drive suspension component 10 is a load beam and generally will comprise stainless steel or aluminum layers 16, 18 and 22. The at least one layer that has interior voids 241 and lands 34 is shown here as the intermediate layer 22. Alternatively, see FIG. 5, where the at least one layer is an outer layer, e.g. 16, or the first and second outer layers 16, 18.

The at least one layer 16, 18 or 22 comprises multiple strands 38, e.g. of a stainless steel wire, arranged to define along their lengths the local region overall pattern P261, P281 of discontinuities. Typically, the at least one layer multiple strands 38 are interfitted to define the intermediate layer 22 and more particularly are interwoven to have alternate successive portions 381, 382 of alternate interwoven strands at the at least one layer surfaces 26, 28 opposite an other layer, e.g. layers 16, 18 sandwiching layer 22 as shown.

Figure 6:
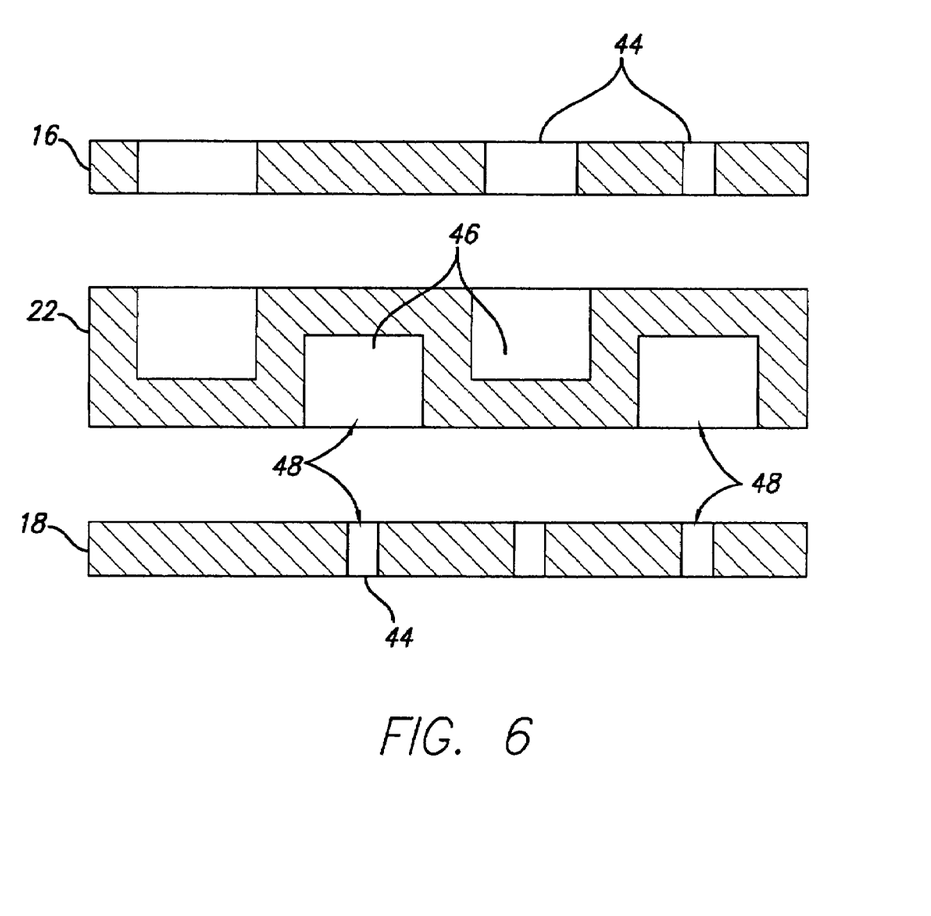
FIG. 6 is an exploded horizontal cross sectional view of a suspension component in one embodiment.

In a further embodiment, see FIGS. 4A, 4B, 5 and 6, the at least one layer 16, 18 or 22 comprises a honeycombed panel 42 arranged to define along its length the local region overall P42, P44 pattern of discontinuities 32. The at least one layer honeycomb panel 42 defines a multiplicity of through openings 44, and can as well define a multiplicity of blind openings 46 in a load beam component 10. In general, as shown in FIG. 6, the outer layers 16, 18 are apertured e.g. at 48 in registration with the blind openings 46 against entrapment of liquids within the blind openings during washing operations, for example. "Honeycomb" herein refers to a structural condition characterized by a multiplicity of regularly arranged adjacent voids 49 at least partially surrounded by walls 51 in lateral and longitudinal directions that form the structure, e.g. FIGS. 4A and 4B, or are formed within the structure, e.g. FIGS. 5 and 6.

Further, the invention provides a disk drive suspension component 10 for carrying a slider 12 at a disk (not shown). Component 10 comprises laminate 14 of at least three metal layers 16, 18 and 22 of like mechanical and chemical formability, such as stainless steel and/or aluminum, the laminate including a first outer layer 16, a second outer layer 18, and an intermediate layer 22. Typically in this embodiment, the intermediate layer 22 defines at least one layer discussed above said intermediate layer having a void-containing interior 24 providing a lower density than at least one of said outer layers 16, 18 and has a surface area 26, 28 comprised of a series of local regions 261, etc. 281 etc. as noted above, distributed across substantially the width W and length L of the intermediate layer with each the local region equaling less than 10% of the surface area; each of the local regions 261, 281, etc. has an overall pattern P of discontinuities 32 and lands 34 between the discontinuities substantially the same as the overall pattern P261, P281 of discontinuities in laterally and longitudinally adjacent local regions 261, 281 for local attachment of the layers at some and not all of the lands 34 to adjacent layers 16, 18 to form a laminate 14 having common formability properties. Regions 261, 281 are undivided and free of definite boundaries; they serve as a concept to make clear that the surfaces 26, 28 are commonly formed overall and locally with respect to their pattern P of discontinuities 32, lands 34 and particularly attachments sites 341. Thus, any region 261, 281 part of the surfaces 26, 28 are alike wherever the regions are defined.

Component 10 is configured as shown as a support arm or load beam. The first and second outer layers 16, 18 are substantially planar opposite each other as shown. The intermediate layer 22 is grossly substantially planar but the local region patterns P261, P281 of discontinuities and lands define locally nonplanar surfaces 26, 28b on the intermediate layer opposite at least one of the first and second outer layers 16, 18. The intermediate layer 22 has discontinuous nonplanar surfaces 26, 28 opposite both the first and second outer layers 16, 18. Intermediate layer 22 in the first embodiment comprises multiple strands 38 arranged to define along their lengths the local region overall pattern P261, P281 of discontinuities 32 and lands 34. The intermediate layer multiple strands 38 are interfitted to define the intermediate layer 22, including being interwoven to have alternate successive portions 381, 382 of alternate interwoven strands define the lands 34 at the intermediate layer surfaces 26, 28 opposite the first and second outer layers 16, 18 in a distributive pattern P of oppositely facing attachment sites 341 for attaching the intermediate layer to the outer layers.

In a second embodiment, the at least one layer be it an outer layer 16, 18 or the intermediate layer 22 comprises a honeycomb panel 42 arranged to define along its length the local region overall pattern of discontinuities 32 and lands 34, e.g. the at least one layer honeycomb panel 42 can defines a multiplicity of through openings 44 and optionally a multiplicity of blind openings 46 as well as the multiplicity of through openings. Suitably, the outer layers 16, 18 in this case are typically apertured at 48 in registration with the blind openings against entrapment of liquids within the blind openings during manufacturing operations.

In a further embodiment, an assembly 52 is provided for a disk drive suspension component 10 for carrying a slider 12 at a disk. Component assembly 52 comprises a first substantially planar outer layer 16 second substantially planar outer layer 18 and a substantially planar intermediate layer 22. At least one of the layers 16, 18, 22 has a nonplanar surface, e.g. surface 26 of layer 22 opposite and arranged for substantially universal contact with an other layer (16, 18 in this case) and comprises a distributive pattern P of numerous potential local attachment sites 341. At least one of the other layers 16, 18, 22 is attached to the at least one layer at selected plural ones 342 of all of the local attachment sites 341 that are less in number than the potential attachment sites, whereby selective attachment of an other layer to the at least one layer is facilitated.

As in previous embodiments, typically the component assembly 52 is a load beam, the at least one layer is the intermediate layer 22, an outer layer 16 or 18 or two outer layers, both 16 and 18. The at least one layer 16, 18, 22 comprises multiple strands 38 arranged to define along their lengths an overall pattern P of discontinuities 32 and lands 34 between the discontinuities; the lands 34 defining the attachment sites 341. Multiple strands 38 are interwoven to have alternate successive portions 381, 382 of alternate interwoven strands form the lands 34. Or, the at least one layer 16, 18, 22 comprises a honeycombed panel 42 arranged to define along its length an overall pattern of discontinuities 32 and lands 34 between the discontinuities, the lands defining the attachment sites 341. And/or the at least one layer honeycomb panel 42 defines a multiplicity of through openings 44, a multiplicity of blind openings 46 as well as the multiplicity of through openings, with the outer layers 16, 18 being apertured in registration with the openings 44, 46 against entrapment of liquids within the openings.

In a further embodiment, a disk drive suspension component 10 carries a slider 12 at a disk, the component comprising a laminate 14 of at least three layers including a first substantially planar outer layer 16, a second substantially planar outer layer 18, and a substantially planar intermediate layer 22 having a nonplanar surface 26, 28 defining a distributive pattern P of oppositely facing numerous attachment sites 341 across the intermediate layer opposite the first and second outer layers. First and second outer layers 16, 18 are fixed to some attachment sites 342 and less than all of the numerous attachment sites 341.

Further explained, the invention provides a disk drive suspension component 10 for carrying a slider 14 at a disk, the component comprising an elongated structure 54 having a portion 541 adapted to be cantilevered from the remainder 56 of the structure. The portion 541 comprises a laminate 58 of opposed outer layers 16, 18 having like coefficients of thermal expansion, i.e. CTE's, and that are too thin to be self-supporting in cantilevered condition, and an inner layer 22 having a like CTE to the outer layer CTE's and that may also be too thin to be self-supporting in cantilevered condition. Inner layer 22 has interior voids 24 and spaces the outer layers 16, 18 in cantilevered portion laminate 58 defining relation. Inner layer 22 typically comprises a web 62 of regularly spaced discontinuities 32 and lands 34 defining successive upper and lower attachment sites 341 in bonding relation with the opposing layers 16, 18, whereby the cantilevered portion laminate is self-supporting in cantilevered condition and in which some 342 and not all of the attachment sites 341 are in the bonding relation.

In its method aspects, a method of manufacturing a disk drive suspension component 10 includes registering upper and lower metal layers 16, 18 with a metal intermediate layer 22 having overall a surface of regularly arranged discontinuities 32 and lands 34 defining numerous attachment sites 341, and bonding the outer layers to the intermediate layer at some 342 but not all of the attachment sites.

In a further method for supporting a slider 12 at a disk with a cantilevered component 10 having at least three metal layers 16, 18 and 22, the invention method includes reducing the density of at least one of the three layers with interior voids 24, raising numerous protruding attachment sites 34 on at least one of three layers, bonding the layers together at some 342 but not all of the attachment sites 341, chemically and/or mechanically altering the metal layers in common, and supporting a slider therewith.

The invention thus provides laminate structures such as load beams and like rigid components of suspensions having substituted for the intermediate or other dissimilar layer a new like-material layer, such as a metal layer, e.g. as a spacing or outer layer, having a lower density than the other layers through the presence of interior voids and having surface discontinuities, e.g. through being an interfitted or woven wire or a honeycomb structure to give rigidity through layer separation and light weight through the low density of the structure. The suspension components described have as a further benefit the possibility of using for the intermediate layer a layer of a material that is chemically and mechanically formable with the outer layers, e.g. an aluminum or stainless steel wire, or metal honeycomb where the outer layers are aluminum or stainless steel, so that the CTE's of the several layers are the same or alike boding well for like thermal response and no distortions from disparate expansions or memory effects of parts, e.g. in side rails formed on the load beam. Etchants can be used that will etch the several layers simultaneously such as a spacing intermediate layer with the outer layers in a single operation, resulting in manufacturing economies. The invention further provides for the connection of widely different surfaces, made possible by the nearly universal provision, aerially speaking, of attachment sites, corresponding to the lands between discontinuities, and the possible use of fewer than all such sites, e.g. only those opposed by a specific portion of an opposing layer. The presence of interior voids, such as honeycomb lacunae and gaps between adjacent wire strands, provides a beam effect increase in rigidity without added weight. The foregoing objects are thus met.

I claim:

1. A disk drive suspension component for carrying a slider at a disk, said component comprising a laminate of at least three metal layers of like mechanical and chemical formability, said laminate including a first outer layer, a second outer layer, and an intermediate layer, at least one of said layers having a void-containing interior and a surface area and comprising a series of local regions distributed across substantially the width and length thereof with each said local region equaling less than 10% of said surface area, each of said local regions having an overall pattern of discontinuities and lands between said discontinuities substantially the same as the overall pattern of discontinuities and lands in laterally and longitudinally adjacent local regions for local attachment of said layers at some and not all of said lands to adjacent layers to form a laminate having common formability properties.

2. The disk drive suspension component according to claim 1, in which said component is a load beam and at least one of said layers comprises stainless steel or aluminum.

3. The disk drive suspension component according to claim 1, in which said at least one layer is the intermediate layer.

4. The disk drive suspension component according to claim 3, in which said at least one layer is an outer layer.

5. The disk drive suspension component according to claim 3, in which said first and second outer layers each define said at least one layer.

6. The disk drive suspension component according to claim 1, in which said at least one layer comprises multiple strands arranged to define along their lengths said local region overall pattern of discontinuities.

7. The disk drive suspension component according to claim 6, in which said at least one layer multiple strands are interfitted to define said intermediate layer.

8. The disk drive suspension component according to claim 7, in which said at least one layer strands are interwoven to have alternate successive portions of alternate interwoven strands at said one layer surfaces opposite said an other layer.

9. The disk drive suspension component according to claim 1, in which said at least one layer comprises a honeycomb panel arranged to define along its length said local region overall pattern of discontinuities.

10. The disk drive suspension component according to claim 9, in which said at least one layer honeycomb panel defines a multiplicity of through openings.

11. The disk drive suspension component according to claim 10, in which said at least one layer honeycomb panel defines a multiplicity of blind openings as well as said multiplicity of through openings.

12. The disk drive suspension component according to claim 11, in which said component is a load beam and at least one of said layers comprises stainless steel or aluminum.

13. The disk drive suspension load beam according to claim 12, in which said outer layers are apertured in registration with said blind openings against entrapment of liquids within said blind openings.

14. The disk drive suspension component according to claim 13, in which said component is a load beam.

15. A disk drive suspension component for carrying a slider at a disk, said component comprising a laminate of at least three metal layers of like mechanical and chemical formability, said laminate including a first outer layer, a second outer layer, and an intermediate layer, said intermediate layer having a void-containing interior providing a lower density than at least one of said outer layers and a surface area and comprising a series of local regions distributed across substantially the width and length of said intermediate layer with each said local region equaling less than 10% of said surface area, each of said local regions having an overall pattern of discontinuities and lands between said discontinuities substantially the same as the overall pattern of discontinuities in laterally and longitudinally adjacent local regions for local attachment of said layers at some and not all of said lands to adjacent layers to form a laminate having common formability properties.

16. The disk drive suspension component according to claim 15, in which said component is a load beam.

17. The disk drive suspension component according to claim 15, in which said first and second outer layers are substantially planar opposite each other.

18. The disk drive suspension component according to claim 15, in which said intermediate layer is grossly substantially planar, and has interior voids lowering its density to less than 70% of at least one outer layer, said local region patterns of discontinuities and lands defining locally nonplanar surfaces on said intermediate layer opposite at least one of said first and second outer layers.

19. The disk drive suspension component according to claim 18, in which said intermediate layer has discontinuous nonplanar surfaces opposite both said first and second outer layers.

20. The disk drive suspension component according to claim 19, in which said intermediate layer comprises multiple strands arranged to define along their lengths said local region overall pattern of discontinuities and lands.

21. The disk drive suspension component according to claim 20, in which said intermediate layer multiple strands are interfitted to define said intermediate layer.

22. The disk drive suspension component according to claim 21, in which said intermediate layer strands are interwoven to have alternate successive portions of alternate interwoven strands define said lands at said intermediate layer surfaces opposite said first and second outer layers.

23. The disk drive suspension component according to claim 15, in which said intermediate layer comprises multiple strands interfitted to define said intermediate layer, successive portions of said strands defining said lands and thereby a distributive pattern of oppositely facing attachment sites for attaching said intermediate layer to said outer layers.

24. The disk drive suspension component according to claim 15, in which said intermediate layer strands are interwoven, said successive strand portions of alternate interfitted strands defining successively said lands as oppositely facing attachment sites.

25. The disk drive suspension component according to claim 24, in which said component is a load beam.

26. The disk drive suspension component according to claim 15, in which said intermediate layer comprises a honeycomb panel arranged to define along its length said local region overall pattern of discontinuities and lands.

27. The disk drive suspension component according to claim 26, in which said at least one layer honeycomb panel defines a multiplicity of through openings.

28. The disk drive suspension component according to claim 27, in which said at least one layer honeycomb panel defines a multiplicity of blind openings as well as said multiplicity of through openings.

29. The disk drive suspension component according to claim 27, in which said component is a load beam.

30. The disk drive suspension load beam according to claim 29, in which said outer layers are apertured in registration with said blind openings against entrapment of liquids within said blind openings.

31. An assembly for a disk drive suspension component for carrying a slider at a disk, said component assembly comprising a first substantially planar outer layer, a second substantially planar outer layer, and a substantially planar intermediate layer, at least one of said layers having interior voids lowering its density to a value selected from 30%, 50% and 70% of that of said at least one outer layer, a nonplanar surface opposite and arranged for substantially universal contact with an other layer and comprising a distributive pattern of numerous potential local attachment sites, at least one of said other layers being attached to said at least one layer at plural ones of said local attachment sites that are less in number than said potential attachment sites, whereby selective attachment of an other layer to said at least one layer is facilitated.

32. The assembly according to claim 31, in which said component assembly is a load beam.

33. The assembly according to claim 31, in which said at least one layer is the intermediate layer, an outer layer or two outer layers.

34. The assembly according to claim 31, in which said at least one layer comprises multiple strands arranged to define along their lengths an overall pattern of discontinuities and lands between said discontinuities, said lands defining said attachment sites.

35. The assembly according to claim 34, in which said multiple strands are interwoven to have alternate successive portions of alternate interwoven strands form said lands.

36. The assembly according to claim 31, in which said at least one layer comprises a honeycomb panel arranged to define along its length an overall pattern of discontinuities and lands between said discontinuities, said lands defining said attachment sites.

37. The assembly according to claim 36, in which said at least one layer honeycomb panel defines a multiplicity of through openings.

38. The assembly according to claim 37, in which said at least one layer honeycomb panel defines a multiplicity of blind openings as well as said multiplicity of through openings.

39. The assembly according to claim 37, in which said component is a load beam and comprises stainless steel in all layers.

40. The load beam according to claim 39, in which said outer layers are apertured in registration with said openings against entrapment of liquids within said openings.

41. A disk drive suspension component for carrying a slider at a disk, said component comprising a laminate of at least three layers including a first substantially planar outer layer, a second substantially planar outer layer, and a substantially planar intermediate layer of lower density than said outer layers and having a nonplanar surface defining a distributive pattern of oppositely facing numerous attachment sites across said intermediate layer opposite said first and second outer layers, said first and second outer layers being fixed to some and less than all of said numerous attachment sites.

42. A disk drive suspension component for carrying a slider at a disk, said component comprising an elongated structure having a portion adapted to be cantilevered from the remainder of said structure, said portion comprising a laminate of opposed outer layers having like CTE's and that are too thin to be self-supporting in cantilevered condition and an inner layer having a like CTE to and a lower density than said outer layers, said inner layer spacing said outer layers in cantilevered portion laminate defining relation, said inner layer comprising a web of regularly spaced interior void defining discontinuities and lands defining successive upper and lower attachment sites in bonding relation with said opposing layers, whereby said cantilevered portion laminate is self-supporting in cantilevered condition.

43. The disk drive suspension component according to claim 42, in which some and not all of said attachment sites are in said bonding relation.

44. A method of manufacturing a disk drive suspension component, including registering upper and lower metal layers with a metal intermediate layer of relatively lower density than at least one of said upper and lower metal layers and having overall a surface of regularly arranged discontinuities and lands defining numerous attachment sites, and bonding said outer layers to said intermediate layer at some but not all of said attachment sites.

45. A method of supporting a slider at a disk with a cantilevered component having at least three metal layers, including reducing the density of at least one of said three layers with interior voids, raising numerous protruding attachment sites on at least one of said three layers, bonding said layers together at some but not all of said attachment sites, chemically and/or mechanically altering said metal layers in common, and supporting a slider therewith.

* * * * *